(12) United States Patent
Hirai et al.

(10) Patent No.: US 7,942,585 B2
(45) Date of Patent: May 17, 2011

(54) WHEEL BEARING APPARATUS FOR A VEHICLE

(75) Inventors: Isao Hirai, Iwata (JP); Takayasu Takubo, Iwata (JP); Kiyotake Shibata, Iwata (JP); Syougo Suzuki, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/647,636

(22) Filed: Dec. 28, 2009

(65) Prior Publication Data
US 2010/0098367 A1  Apr. 22, 2010

Related U.S. Application Data

(63) Continuation of application No. PCT/JP2008/001629, filed on Jun. 24, 2008.

(30) Foreign Application Priority Data

Jun. 28, 2007  (JP) .................................. 2007-170038

(51) Int. Cl.
  *F16C 13/00* (2006.01)
  *B60B 35/00* (2006.01)

(52) U.S. Cl. .................................. 384/544; 301/35.627

(58) Field of Classification Search .................. 384/544, 384/589; 301/105, 35.627; 29/894.36, 894.362
See application file for complete search history.

(56) References Cited

U.S. PATENT DOCUMENTS

| 2,781,231 | A  | * | 2/1957 | Black ......................... 301/105.1 |
| 7,393,064 | B2 | * | 7/2008 | Hall et al. .................. 29/894.36 |
| 2004/0017104 | A1 | * | 1/2004 | Fakhoury et al. .......... 301/105.1 |
| 2005/0018939 | A1 |   | 1/2005 | Niwa et al. |

FOREIGN PATENT DOCUMENTS

| CN | 1576061 A | 2/2005 |
| EP | 1 500 524 A2 | 1/2005 |
| JP | 2005-059830 | 3/2005 |
| JP | 2005-059831 | 3/2005 |
| JP | 2005-059832 | 3/2005 |
| JP | 2005-140192 | 6/2005 |
| JP | 2005-297925 | 10/2005 |
| JP | 2006-273246 | 10/2006 |

* cited by examiner

*Primary Examiner* — Thomas R Hannon
(74) *Attorney, Agent, or Firm* — Harness, Dickey & Pierce, P.L.C.

(57) ABSTRACT

A vehicle wheel bearing apparatus has an outer member, an inner member, and double row rolling elements freely rollably contained between the inner and outer raceway surfaces of the inner and outer members. A brake pilot portion extends from a base of a wheel hub mounting flange toward the outer side to guide an inner circumferential surface of a brake rotor. A wheel pilot portion extends from the brake pilot portion further toward the outer side to guide an inner circumferential surface of the wheel. The wheel pilot portion including a plurality of separated pilots separated along a circumferential direction. A chamfered portion is formed, by forging, on a forward end of each separated pilot in view of its lathe cutting direction. The chamfered portion has a predetermined inclined angle relative to an axial end surface of each separated pilot after lathe cutting.

8 Claims, 6 Drawing Sheets

[Fig 1]
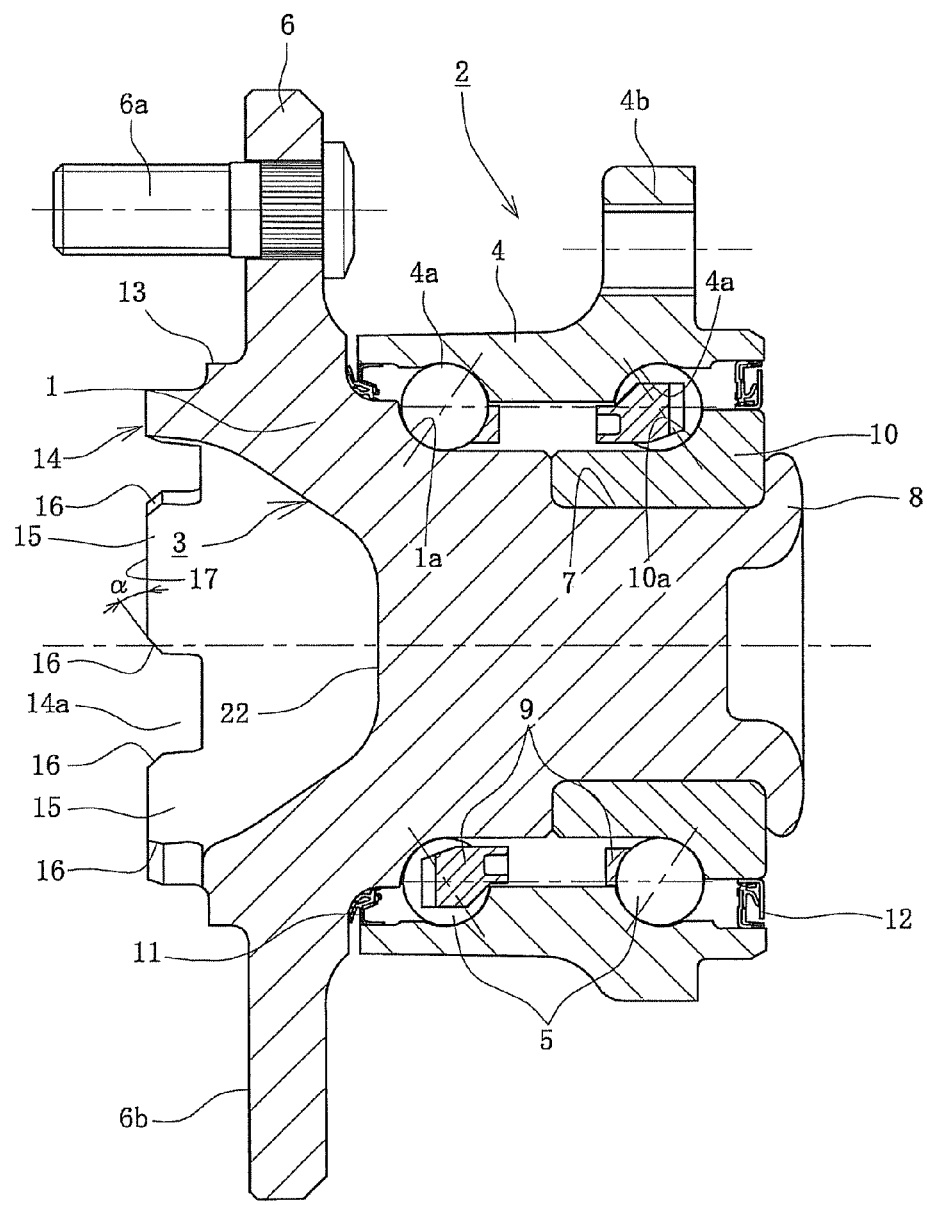

[ Fig 1(a) ]
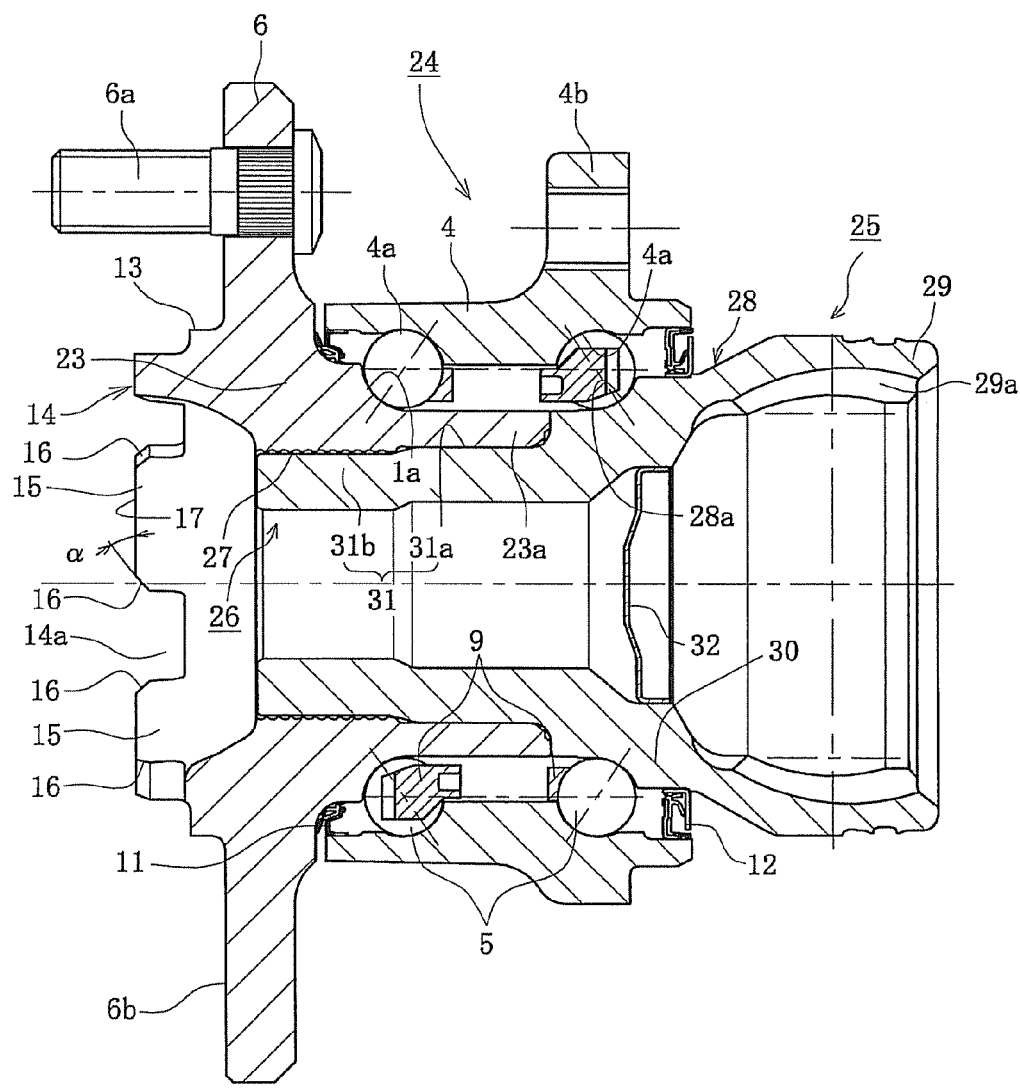

[Fig 2]
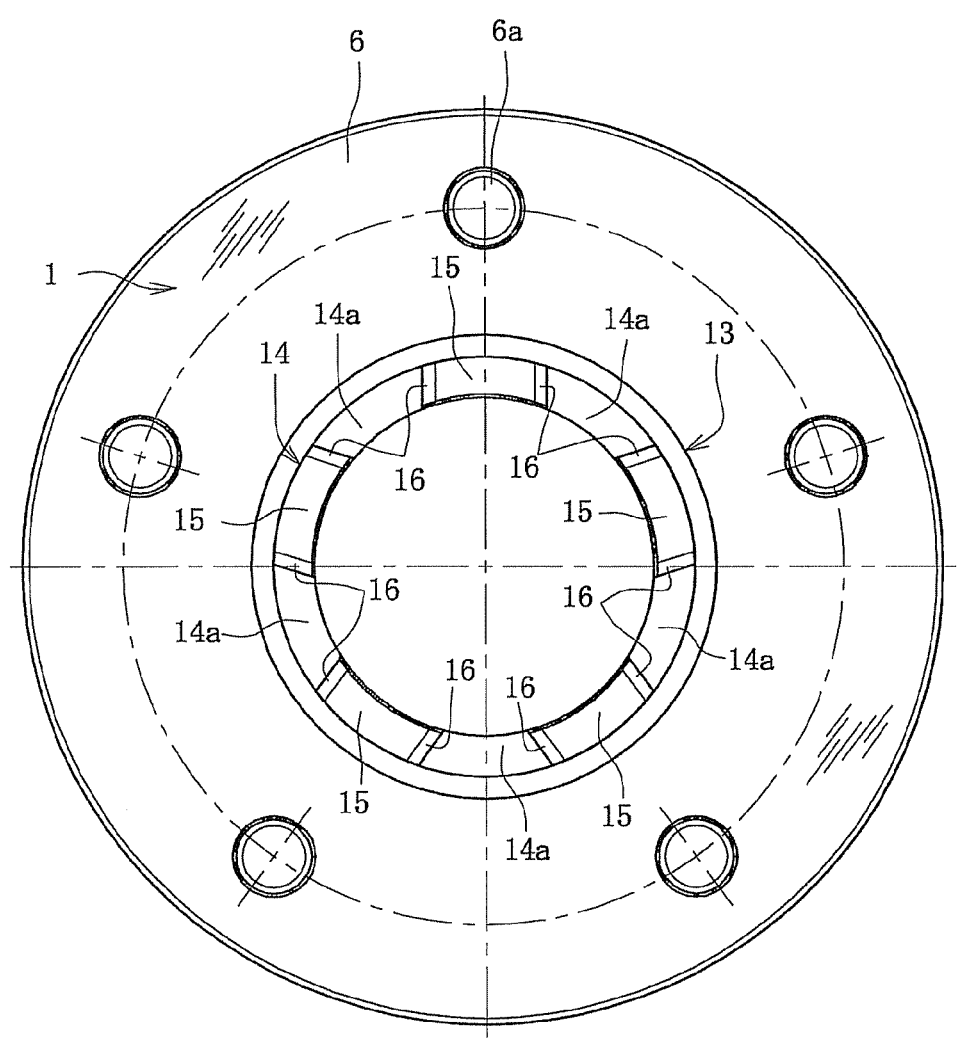

[ Fig 3 ]
(a)
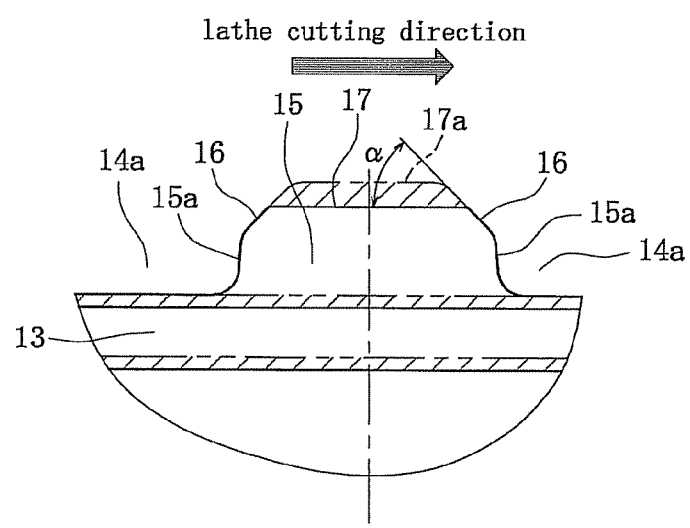
(b)
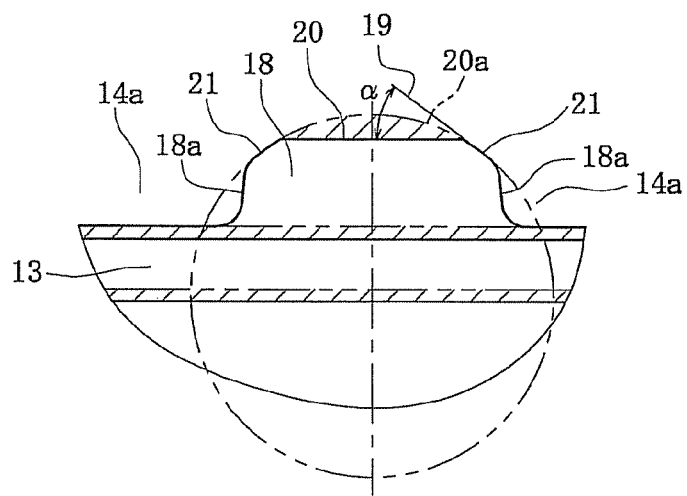

[Fig 4]
PRIOR ART
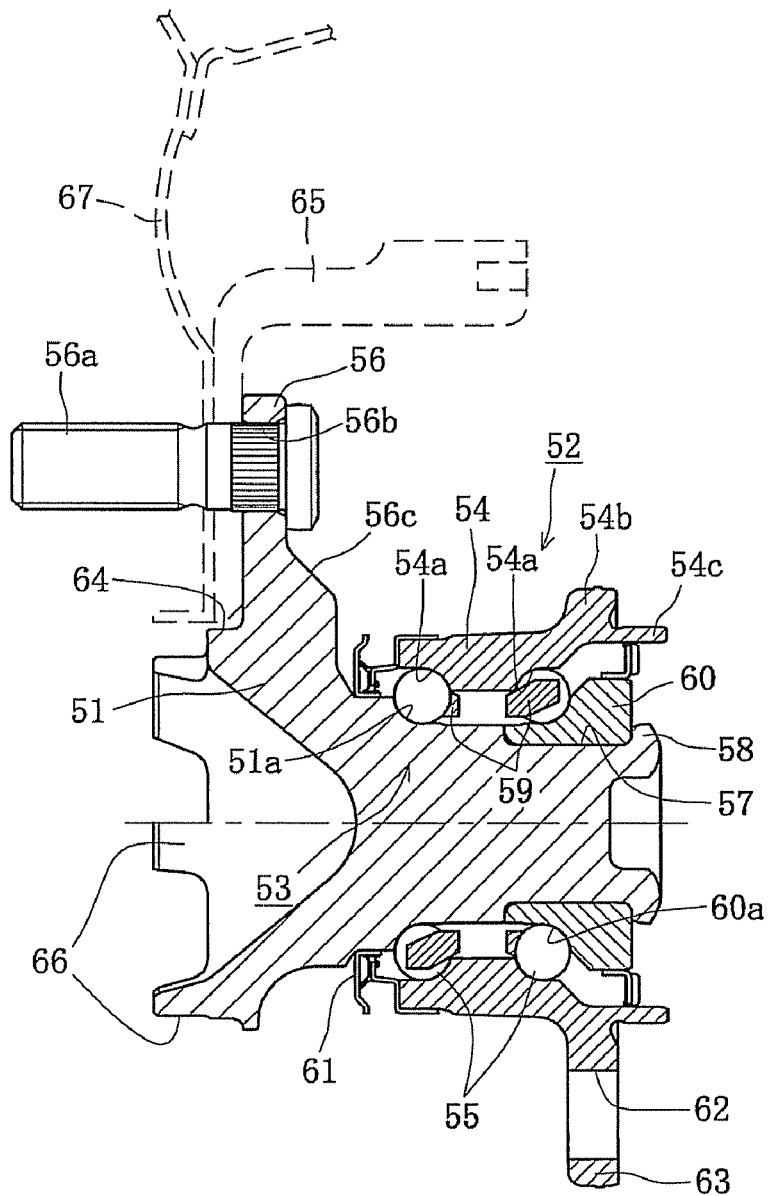

[ Fig 5 ]
PRIOR ART
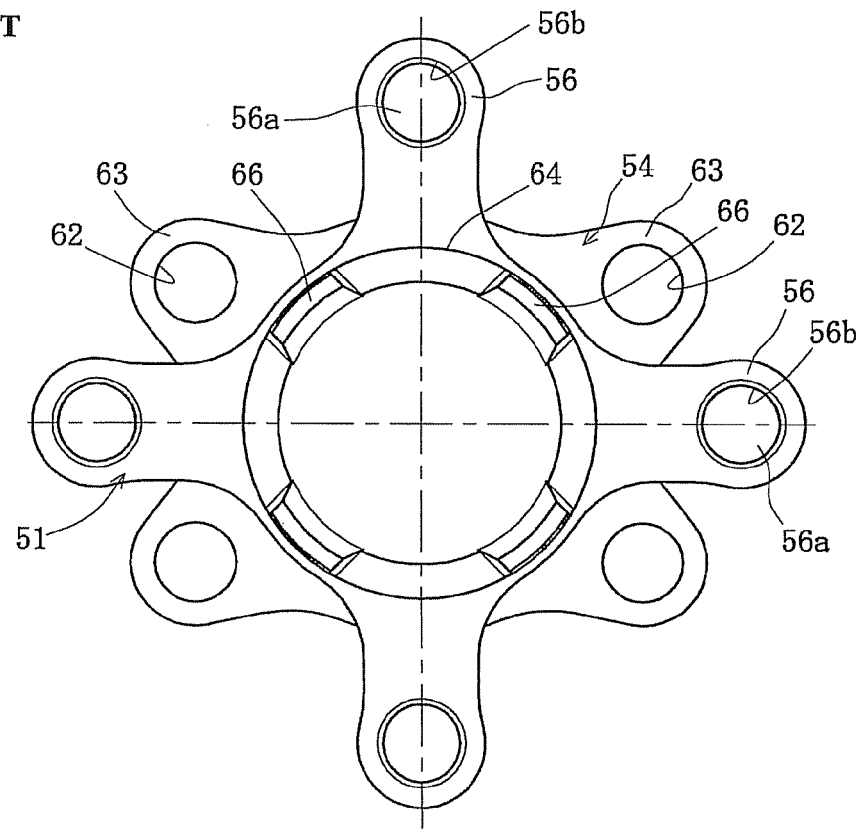
[ Fig 6 ]
(a)
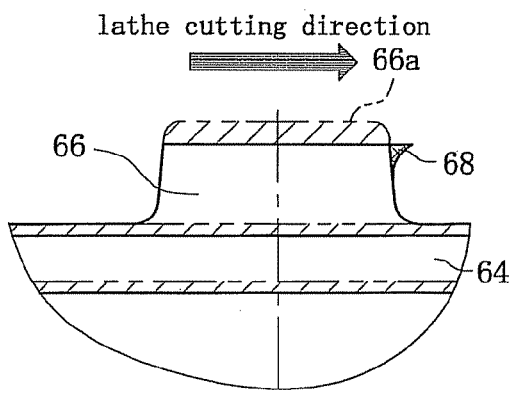
(b)
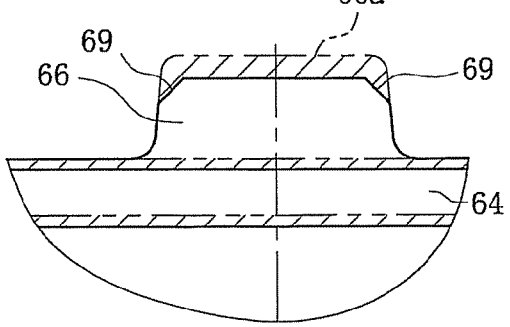

WHEEL BEARING APPARATUS FOR A VEHICLE

CROSS-REFERENCE TO RELATED APPLICATIONS

This application is a continuation of International Application No. PCT/JP2008/001629, filed Jun. 24, 2008, which claims priority to Japanese Application No. 2007-170038, filed Jun. 28, 2007. The disclosures of the above applications are incorporated herein by reference.

FIELD

The present disclosure relates to a vehicle wheel bearing apparatus to rotatably support a wheel of a vehicle, such as an automobile, relative to its suspension apparatus and, more particularly, to a vehicle wheel bearing apparatus intended to reduce the weight and manufacturing cost by reducing material loss.

BACKGROUND

Recently there has been a large demand to improve vehicle fuel consumption in view of resource savings and environmental pollution. It is desirable to reduce the weight of automobile parts, particularly wheel bearing apparatus, to achieve the demand for fuel consumption. Such a demand to reduce the weight of parts has increased, especially, in small sized cars such as light weight 4-wheel cars. Thus, various proposals relating to the wheel bearing apparatus to reduce their weight have been proposed. On the other hand, it is also important to improve the reliability and durability of the wheel bearing apparatus although it is antinomic to the reduction of its weight.

FIG. 4 shows one example of a vehicle wheel bearing apparatus used in a vehicle intended to reduce its weight. The wheel bearing apparatus 52 has a representative structure used for a driven wheel. It includes an inner member 53 including a wheel hub 51, an inner ring 60 press-fit onto the wheel hub 51, an outer member 54, and double row balls 55, 55. The double row balls 55, 55 are contained between the inner and outer members 53, 54. In the descriptions below, the term "outer side" defines a side that is positioned on the outer side of a vehicle body (left-hand side of FIG. 4) and the term "inner side" defines a side that is positioned on the inner side of the vehicle body (right-hand side of FIG. 4) when the wheel bearing apparatus is mounted on the vehicle body.

The wheel hub 51 is integrally formed with four separated wheel mounting flanges 56 (hereinafter referred to as "wheel mounting arms"). The flange 56 radially extends at the wheel hub outer side end. Hub bolts 56a, to fasten a wheel, are secured on the wheel mounting arms 56 equidistantly on one virtual circle. As shown in FIG. 5, each wheel mounting arm 56 is formed so that it radially projects from a brake pilot portion 64. The mounting arm 56 has substantially the same width as a portion where a through aperture 56b for the hub bolt is formed, except a portion near the hub bolt through aperture 56b.

Further as shown in FIG. 4, a rib 56c is formed on the inner side of the wheel mounting arms 56. The ribs 56c have a gradually increasing wall thickness toward their bases. The wheel hub 51 is formed on its outer circumference with an outer side inner raceway surface 51a. The wheel hub 51 has a cylindrical portion 57 that axially extends from the inner raceway surface 51a. The inner ring 60 is press-fit onto the cylindrical portion 57, via a predetermined interference. The inner ring 60 is formed with an inner side inner raceway surface 60a on its outer circumference. The inner ring 60 is axially secured on the cylindrical portion 57 by a caulked portion 58 that is formed by plastically deforming an end portion of the cylindrical portion 57 of the wheel hub 51.

The outer member 54 is formed with double row outer raceway surfaces 54a, 54a on its inner circumference. The double row balls 55, 55 are rollably contained and held by cages 59 between the mutually opposed outer and inner raceway surfaces 54a, 54a and 51a, 60a.

A seal 61 is mounted on the outer side end of the outer member 54 to seal an annular space formed between the outer member 54 and the inner member 53. A cup shaped sealing cap (not shown) is mounted on the inner side end portion of the outer member 54 to close an opening of the outer member 54. The seal 61 and sealing cap prevent leakage of lubricating grease sealed in the bearing apparatus. Additionally, the seal prevents entry of rainwater and dusts etc. into the inside of the bearing apparatus.

The outer member 54 is integrally formed with a body mounting flange 54b. The body mounting flange 54b is mounted on a knuckle (not shown) forming part of a suspension apparatus. A plurality of bolts apertures 62 is formed on the outer end of the body mounting flange 54b. As shown in FIG. 5, the body mounting flange 54b is formed with a plurality of radially projected partial flanges 63 separated in a circumferential direction only in portions where the bolt apertures 62 are formed. The inner side end of the outer member 54 is formed with a cylindrical knuckle pilot portion 54c. The pilot portion 54c axially extends from the body mounting flange 54b. A knuckle (not shown) is adapted to be fit onto the outer circumference of the knuckle pilot portion 54c.

The base of the wheel mounting arms 56 of the wheel hub 51 is formed with a cylindrical brake pilot portion 64. The brake pilot portion 64 extends toward the outer side and is adapted to guide an inner circumference of the brake rotor 65. Wheel pilot portions 66 are also formed on the wheel hub 51. The wheel pilot portions 66 extend from the brake pilot portion 64 toward the outer side. The wheel pilot portions 66 are intended to guide the inner circumference of a wheel 67 to be mounted on the wheel hub 51 being overlapped with the brake rotor 65. The wheel pilot portions 66 are formed with an outer diameter slightly smaller than that of the brake pilot portion 64.

A plurality of notches is formed on the wheel pilot portions 66 in their circumferential direction as discontinuous projections. These discontinuous wheel pilot portions 66 are formed equidistantly in the circumferential direction between adjacent wheel mounting arms 56. This reduces the weight of the wheel hub 51 and enables a relatively uniform thickness in the circumferential direction of the annular base of the wheel mounting arm 56. Thus, this improves the workability during forging of the wheel hub due to easy plastic flow attained in the forged material. Accordingly, it is possible to improve the forging accuracy and productivity of the article. Thus, this reduces the manufacturing cost. Patent Document 1: Japanese Laid-open Patent Publication No. 297925/2005

However, in the prior art wheel bearing apparatus, since they are forged with the plurality of notches in the circumferential direction of the wheel pilot portions 66, cutting burrs 68 (shown by hatching in FIG. 6(a)) tends to be easily generated during a lathe cutting process after forging. This is due to discontinuous cutting (shown by dotted line) of an end 66a. The generated burrs 68 are be bit between reference surfaces during machining processes or between mounting surfaces of the brake rotor 65 and the wheel 67 and cause inaccuracy during machining or mounting.

The generated burrs 68 will be removed by forming chamfered portions 69 on a corner of each wheel pilot portion 66 where the burrs are generated. However, the chamfered portion 69 cannot be formed by lathe cutting and should be formed by applying a cutting tool onto the burred corner of the wheel pilot portion 66. The tool is reciprocated in a radial direction. This is very cumbersome and thus increase the manufacturing cost of the wheel bearing apparatus.

It is also desirable to reduce material loss wasted by cutting and to efficiently and effectively use the material blank.

SUMMARY

It is therefore an object of the present disclosure to provide a wheel bearing apparatus that reduces its weight while reducing material loss and thus, its manufacturing cost.

To achieve the object of the present disclosure, a vehicle wheel bearing apparatus comprises an outer member formed with double row outer raceway surfaces on its inner circumference. An inner member includes a wheel hub and at least one inner ring or an outer joint member of a constant velocity universal joint. The wheel hub is formed with a wheel mounting flange on its outer side end. The wheel mounting flange includes hub bolts equidistantly secured along its outer circumference to mount a wheel. Also, the wheel hub includes an axially extending cylindrical portion. The inner ring is press-fit onto the cylindrical portion of the wheel hub. The inner member is formed with an inner raceway surface on its outer circumference. The inner raceway surfaces oppose the double row outer raceway surfaces. Double row rolling elements are freely rollably contained between the inner and outer raceway surfaces of the inner and outer members. The wheel hub has a brake pilot portion extending from the base of the wheel mounting flange toward the outer side to guide an inner circumferential surface of a brake rotor. A wheel pilot portion extends from the brake pilot portion further towards the outer side to guide an inner circumferential surface of the wheel. The wheel pilot portion includes a plurality of separated pilots separated along the circumferential direction. A chamfered portion is formed, by forging, on a forward end of each separated pilot in view of its lathe cutting direction. The chamfered portion has a predetermined inclined angle relative to an axial end surface of each separated pilot after lathe cutting.

In a wheel bearing apparatus of the first generation through fourth generation structure, the wheel hub has a brake pilot portion extending from the base of the wheel mounting flange toward the outer side to guide an inner circumferential surface of a brake rotor. It has a wheel pilot portion that extends from the brake pilot portion further toward the outer side to guide an inner circumferential surface of the wheel. The wheel pilot portion includes a plurality of separated pilots separated along the circumferential direction. A chamfered portion is formed, by forging, on a forward end of each separated pilot in view of its lathe cutting direction. The chamfered portion has a predetermined inclined angle relative to an axial end surface of each separated pilot after the lathe cutting. Thus, it is possible to reduce the weight of the wheel bearing apparatus and to eliminate the cutting burr removing process generated on the circumferential end of each separated pilot during lathe cutting of the wheel pilot portion. Accordingly, the reduction of the manufacturing steps and the removing volume of blank material can reduce the manufacturing cost.

The chamfered portion is formed on both circumferential end surfaces of the separated pilot. This further reduces the material loss during lathe cutting.

The chamfered portion may be formed with a flat surface. The chamfered portion may be formed with a circular arc convex surface. The tangential line of the circular arc convex surface forms a predetermined angle relative to an axial end surface of the separated pilot after lathe cutting.

The inclined angle is set at 45° or less. This makes it possible to reduce the crossing angle between the chamfered portion and the separated pilot portion during lathe cutting of the wheel pilot portion. Thus, this prevents the generation of the cutting burrs.

The wheel pilot portion includes separated pilots equidistantly arranged along the circumference of the wheel pilot portion. The separated pilots are arranged at a same phase as that of the hub bolts. This suppresses the deformation of the outer side surface of the wheel mounting flange during press-fitting of the hub bolts into the wheel mounting flange.

The brake pilot portion is separated into a plurality of circumferentially separated pilots separated along a circumferential direction and arranged at the same phase as that of the separated pilots of the wheel pilot portion. A chamfered portion is formed, by forging, on a forward end of each separated pilot in view of its lathe cutting direction. The chamfered portion has a predetermined inclined angle relative to an axial end surface of each separated pilot after the lathe cutting. This makes it possible to further reduce the weight of the wheel bearing apparatus and to eliminate the cutting burr removing process generated on the circumferential end of each separated pilot during lathe cutting of the wheel pilot portion. Accordingly, the reduction of the manufacturing steps and the removing volume of blank material can reduce the manufacturing cost.

One of the inner raceway surfaces is directly formed on the outer circumference of the wheel hub. The inner ring is axially secured under a preloaded condition of the bearing by a caulked portion. The caulked portion is formed by plastically deforming an end of the cylindrical portion radially outward. A cup-shaped recess extends to near the bottom of the inner raceway surface. The recess is formed by forging at the outer side end of the wheel hub. A wall thickness of the outer side portion of the wheel hub is substantially uniform. This makes it possible to reduce the weight and size of the wheel bearing apparatus and to antinomically improve the rigidity and durability of the wheel hub.

The vehicle wheel bearing apparatus of the present disclosure includes an outer member formed with double row outer raceway surfaces on its inner circumference. An inner member includes a wheel hub and at least one inner ring or an outer joint member of a constant velocity universal joint. The wheel hub is formed with a wheel mounting flange on its outer side end. The wheel mounting flange has hub bolts that are equidistantly secured along its outer circumference to mount a wheel. The wheel hub has an axially extending cylindrical portion. The inner ring is press-fit onto the cylindrical portion of the wheel hub. The inner member is formed, on its outer circumference, with inner raceway surfaces that oppose the double row outer raceway surfaces. Double row rolling elements are freely rollably contained between the inner and outer raceway surfaces of the inner and outer members. The wheel hub has a brake pilot portion that extends from the base of the wheel mounting flange toward the outer side to guide an inner circumferential surface of a brake rotor. It has a wheel pilot portion that extends from the brake pilot portion further toward the outer side to guide an inner circumferential surface of the wheel. The wheel pilot portion includes a plurality of separated pilots separated along the circumferential direction. A chamfered portion is formed, by forging, on a forward end of each separated pilot in view of its lathe cutting direction. The chamfered portion has a predetermined inclined angle relative to an axial end surface of each separated pilot after the lathe cutting. Thus, it is possible to reduce the weight of the wheel bearing apparatus and to eliminate the cutting burr removing process generated on the circumferential end of each separated pilot during lathe cutting of the wheel pilot portion. Accordingly, the reduction of the manufacturing steps and the removing volume of blank material can reduce manufacturing cost.

A vehicle wheel bearing apparatus comprises an outer member formed with a body mounting flange on its outer circumference. The body mounting flange is to be mounted on a knuckle of a vehicle. The outer member inner circumference includes double row outer raceway surfaces. An inner member includes a wheel hub and an inner ring. The wheel hub is formed with a wheel mounting flange on its outer side end. The wheel hub outer circumference includes one inner raceway surface opposite to one of the double row outer raceway surfaces. A cylindrical portion axially extends from the inner raceway surface. The inner ring is press-fit onto the cylindrical portion of the wheel hub. The inner ring outer circumference includes the other inner raceway surface opposite to the other of the double row outer raceway surfaces. Double row rolling elements are freely rollably contained between the inner and outer raceway surfaces of the inner and outer members. The inner ring is axially secured under a preloaded condition of the bearing by a caulked portion. The caulked portion is formed by plastically deforming an end of the cylindrical portion radially outward. The wheel hub has a brake pilot portion that extends from the base of the wheel mounting flange toward the outer side to guide an inner circumferential surface of a brake rotor. A wheel pilot portion extends from the brake pilot portion further towards the outer side to guide an inner circumferential surface of the wheel. The wheel pilot portion includes a plurality of separated pilots separated along the circumferential direction. A chamfered portion is formed, by forging, on a forward end of each separated pilot in view of its lathe cutting direction. The chamfered portion has an inclined angle of 45° or less relative to an axial end surface of each separated pilot after the lathe cutting.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal section view of one preferred embodiment of the vehicle wheel bearing apparatus.

FIG. 1(a) is a longitudinal section view with the constant velocity joint.

FIG. 2 is a front elevation view of the vehicle wheel bearing apparatus of FIG. 1.

FIG. 3(a) is a partially enlarged view of a wheel pilot portion of FIG. 2.

FIG. 3(b) is a partially enlarged view of a modification of FIG. 3(a).

FIG. 4 is a longitudinal section view of a prior art vehicle wheel bearing apparatus.

FIG. 5 is a front elevation view of the prior art vehicle wheel bearing apparatus.

FIG. 6(a) is a partially enlarged view of the wheel pilot portion of FIG. 5.

FIG. 6(b) is a partially enlarged view of a modification of FIG. 6(a).

DETAILED DESCRIPTION

A preferred embodiments of the present disclosure will be hereinafter described with reference to the drawings.

FIG. 1 is a longitudinal section view of one preferred embodiment of the vehicle wheel bearing apparatus. FIG. 2 is a front elevation view of the vehicle wheel bearing apparatus of FIG. 1. FIG. 3(a) is a partially enlarged view of a wheel pilot portion of FIG. 2. FIG. 3(b) is a partially enlarged view of a modification of FIG. 3(a).

The vehicle wheel bearing apparatus 2 of the present disclosure is a third generation type used for a driven wheel. It includes an inner member 3, with a wheel hub 1 and an inner ring 10 press-fit onto the wheel hub 1, an outer member 4, and double row rolling elements (balls) 5, 5 rollably contained between the inner and outer members 3, 4.

The wheel hub 1 is integrally formed with a wheel mounting flange 6 at its one end. One (outer side) inner raceway surface 1a is formed on its outer circumference. A cylindrical portion 7 extends from the inner raceway surface 1a. Hub bolts 6a are equidistantly arranged along the periphery of the wheel mounting flange 6.

An axially extending cup-shaped recess 22 is formed on the outer side end of the wheel hub 1. This recess 22 is formed by forging and extends to near the bottom of the outer side inner raceway surface 1a. Thus, a wall thickness of the outer side portion of the wheel hub 1 that extends from the flange to the inner raceway surface is substantially uniform.

The inner ring 10 is formed with an other (inner side) inner raceway surface 10a on its outer circumference. The inner ring 10 is press-fit onto the cylindrical portion 7 of the wheel hub 1, via a predetermined interference. The inner ring 10 is axially secured on the wheel hub 1 by a caulked portion 8. The caulked portion 8 is formed by plastically deforming the end of the cylindrical portion 7 radially outward so that a so-called "self-retaining structure" is formed. This makes it possible to reduce the size and weight of the wheel bearing apparatus and antinomically improve the rigidity and durability of the wheel hub.

Accordingly, by using caulking to axially secure the inner ring 10, control of amount of the preload of the inner ring by a fastening a nut etc. performed in the prior art can be eliminated. Thus, it is possible to simplify the assembly of the wheel bearing apparatus. Also, it is possible to keep the amount of preload for a long term. Further, it is possible to reduce the number of parts and reduce the manufacturing cost of the wheel bearing apparatus. It will be appreciated that the wheel bearing apparatus of the present disclosure is not limited to the illustrated third generation type. It can also be applied to the so-called second generation type where a pair of inner rings is press-fit onto a cylindrical portion of a wheel hub as well as to the first and fourth generation types.

FIG. 1(a) illustrates the wheel bearing apparatus like that of FIG. 1 with the addition of a constant velocity joint 25. The reference numerals identifying the same elements in FIG. 1 are used in FIG. 1(a).

The wheel hub 23 includes a cylindrical portion 23a. The cylindrical portion 23a includes a bore extending through the wheel hub 23. The wheel hub 23 includes an irregular portion 27 of the bore wall to secure the wheel hub with the constant velocity joint 25 by swaging. The constant velocity joint 25 includes an outer member 28 that includes an inner race way surface 28a opposite the outer race way surface 4a. Additionally, the constant velocity joint 25 includes a mouth portion 29 with a track groove 29a, shoulder 30 and shaft portion 31. The shaft portion 31 includes a spigot portion 31a and a fitting portion 31b. The fitting portion 31b is expanded to contact the irregular portion 17 to secure the constant velocity joint with the wheel hub 23. Additionally, the constant velocity joint includes an end cap 32.

The wheel hub 1 is made of medium/high carbon steel including carbon of 0.40-0.80% by weight such as S53C. It is hardened by high frequency induction quenching so that a region from an inner side base of the wheel mounting flange 6 to the cylindrical portion 7, via the inner raceway surface 1a, is hardened to have a surface hardness of 58-64 HRC. The caulked portion 8 is not quenched and remains as is with its surface hardness after forging. Accordingly, the rigidity of the wheel hub 1 is improved and the fretting wear between the wheel hub 1 and the inner ring 10 can be prevented. Thus, the durability of the wheel hub 1 can be improved. In addition, the workability during plastic deformation of the caulking portion 8 can be improved. The generation of micro cracks in the caulked portion 8 during caulking process can be prevented.

The outer member 4 is integrally formed with a body mounting flange 4b on its outer circumference. The body mounting flange 4b is to be mounted on a knuckle (not shown) forming part of a suspension apparatus of a vehicle. The outer member inner circumference includes double row outer raceway surfaces 4a, 4a opposite to the inner raceway surfaces 1a, 10a of the inner member 3. Double row rolling elements (balls) 5, 5 are contained between the outer raceway surfaces 4a, 4a and the inner raceway surfaces 1a, 10a. They are rollably held by cages 9, 9. Seals 11, 12 are mounted within annular openings formed between the outer member 4 and the inner member 3 (the wheel hub 1 and the inner ring 10). These seals 11, 12 prevent leakage of grease contained in the bearing and the entry of rainwater and dusts into the bearing from the outside.

Similar to the wheel hub 1, the outer member 4 is made of medium/high carbon steel including carbon of 0.40-0.80% by weight such as S53C. The double row outer raceway surfaces 4a, 4a are hardened by high frequency induction quenching to have a surface hardness of 58-64 HRC. The inner ring 10 and balls 5 are made of high carbon chrome bearing steel such as SUJ2. They are hardened to their core by dip quenching to have a surface hardness of 58-64 HRC. Although it is shown here that the double row angular contact ball bearing uses balls 5, 5 as the rolling elements, the present disclosure is not limited to such a bearing and may be applied to a double row tapered roller bearing using tapered rollers as the rolling elements.

According to the present disclosure, a brake pilot portion 13 guides an inner circumference of a brake rotor (not shown). The brake pilot portion 13 is formed on the base of the wheel mounting flange 6 of the wheel hub 1. The brake pilot portion 13 extends toward the outer side. A wheel pilot portion 14 is also formed on the wheel hub 1. The wheel pilot program 14 extends further from the brake pilot portion 13 toward the outer side. The wheel pilot portion 14 is intended to guide an inner circumference of a wheel to be mounted on the wheel hub 1 while being overlapped with the brake rotor. The wheel pilot portion 14 has a diameter slightly smaller than the brake pilot portion 13. A plurality of notches 14a is formed in the wheel pilot portion 14 along its circumference. The notches 14a form separated pilots 15 discontinuously projecting from the brake pilot portion 13.

Although the notches 14a may be arranged at the same phases as those of hub bolts 6a, in this embodiment, the separated pilots 15 are arranged at the same phases of the hub bolts 6a as shown in FIG. 2. This makes it possible to reduce the weight of the wheel hub 1 without reducing its rigidity. Also, this prevents the outer side surface 6b of the wheel mounting flange 6 from being deformed during press-fitting of the hub bolts 6a into the wheel mounting flange 6.

In this embodiment, each of the plurality (herein five) of separated pilots 15 is formed on its circumferential end 15a with a straight chamfered portions 16, as shown in FIG. 3(a). The chamfered portion 16 is formed as a flat surface with a predetermined inclined angle α relative to the axial end surface 17 of each separated pilots 15 after lathe cutting. The lathe cut portion is shown by hatching in FIG. 3(a). The inclination angle α is set at 45° or less, preferably 30° or less. It is believed that cutting burrs would be generated, due to an increase of the crossing angle or the inclination angle α, between the chamfered portion 16 and the axial end surface 17 during lathe cutting of the axial end surface 17a after forging (shown by a two-dotted line) when the inclined angle α exceeds 45°. This makes it possible to further reduce the weight of the wheel bearing apparatus and to eliminate the cutting burr removing process generated on the circumferential end of each separated pilot 15 during lathe cutting of the wheel pilot portion. Accordingly, the reduction of the manufacturing steps and the removing volume of blank material (material loss) can reduce the manufacturing cost.

FIG. 3(b) illustrates a modification of the separated pilot 15 previously described. The same reference numerals are used here like those used to describe the previous embodiment shown in FIG. 3(a). A separate pilot 18 in this modification has an axial end surface 20a formed by forging with a circular arc convex surface. Chamfered portions 21 are formed on circumferential end surfaces 18a with a tangential line 19 of the circular arc convex surface forming a predetermined inclined angle α relative to an axial end surface 20 of the separated pilot 18 after the lathe cutting. The lathe cut portion is shown by a hatching in FIG. 3(b). The inclination angle α is set at 45° or less, preferably 30° or less. This makes it possible to further reduce the weight of the wheel bearing apparatus and to eliminate the cutting burr removing process generated on the circumferential end of each separated pilot 18 during lathe cutting of the wheel pilot portion. Accordingly, the reduction of the manufacturing steps and the removing volume of blank material can reduce the manufacturing cost.

In the illustrated examples, same chamfered portions 16, 21 are shown as formed by forging on the circumferential end surfaces of the separated pilots 15, 18. Thus, it is possible to form the chamfered portion 16, 21 only on a leading end during lathe cutting of the separated pilots 15, 18 where cutting burrs would be generated. In addition, similar to the wheel pilot portion 14, the brake pilot portion 13 can be separated in a circumferential direction. Thus, a similar chamfered portion (or portions) can be formed by forging on the circumferential end surfaces.

The vehicle wheel bearing apparatus of the present disclosure can be applied to any of the first through fourth generation types of wheel bearing apparatus using balls or tapered rollers as rolling elements.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A vehicle wheel bearing apparatus comprising:
   an outer member formed with double row outer raceway surfaces on its inner circumference;
   an inner member including a wheel hub and at least one inner ring or an outer joint member of a constant velocity universal joint, the wheel hub is formed with a wheel mounting flange on its outer side end, the wheel mounting flange includes hub bolts equidistantly secured along its outer circumference to mount a wheel, the wheel hub has an axially extending cylindrical portion, the inner ring is press-fit onto the cylindrical portion of the wheel hub, the inner member is formed, on its outer circumference, with inner raceway surfaces arranged opposite to the double row outer raceway surfaces; and
   double row rolling elements are freely rollably contained between the inner and outer raceway surfaces of the inner and outer members;
   a brake pilot portion extends from a base of the wheel mounting flange toward the outer side to guide an inner circumferential surface of a brake rotor;
   a wheel pilot portion extends from the brake pilot portion further toward the outer side to guide an inner circumferential surface of the wheel, the wheel pilot portion includes a plurality of separated pilots separated along a circumferential direction; and
   a chamfered portion, formed by forging, is on a forward end of each separated pilot in view of its lathe cutting direction, the chamfered portion has a predetermined inclined angle relative to an axial end surface of each separated pilot after lathe cutting.

2. The vehicle wheel bearing apparatus of claim 1, wherein the chamfered portion is formed on both circumferential end surfaces of the separated pilot.

3. The vehicle wheel bearing apparatus of claim 1, wherein the chamfered portion is formed with a flat surface.

4. The vehicle wheel bearing apparatus of claim 1, wherein the chamfered portion is formed with a circular arc convex surface, and a tangential line of the circular arc convex surface forms a predetermined angle ($\alpha$) relative to an axial end surface of the separated pilot after the lathe cutting.

5. The vehicle wheel bearing apparatus of claim 1, wherein the inclined angle is set at 45° or less.

6. The vehicle wheel bearing apparatus of claim 1, wherein the wheel pilot portion is comprised of separated pilots equidistantly arranged along a circumference of the wheel pilot portion, and the separated pilots are arranged at a same phase as that of the hub bolts.

7. The vehicle wheel bearing apparatus of claim 1, wherein the brake pilot portion is separated into a plurality of circumferentially separated pilots separated along a circumferential direction and arranged at a same phase as that of the separated pilots of the wheel pilot portion, and a chamfered portion, formed by forging, is on a forward end of each separated pilot in view of its lathe cutting direction, the chamfered portion has a predetermined inclined angle relative to an axial end surface of each separated pilot after lathe cutting.

8. The vehicle wheel bearing apparatus of claim 1, wherein one of the inner raceway surfaces is directly formed on the outer circumference of the wheel hub, the inner ring is axially secured under a preloaded condition of the bearing by a caulked portion, the caulked portion is formed by plastically deforming an end of the cylindrical portion radially outward, a cup-shaped recess extends to near the bottom of the inner raceway surface and is formed by forging at the outer side end of the wheel hub, and wherein a wall thickness of the outer side portion of the wheel hub is substantially uniform.

* * * * *